US011237710B2

(12) United States Patent
Osborne et al.

(10) Patent No.: US 11,237,710 B2
(45) Date of Patent: Feb. 1, 2022

(54) MULTI-FUNCTION SLIDE CONTROL

(71) Applicant: Lenovo (Singapore) Pte. Ltd., Singapore (SG)

(72) Inventors: Christopher Miles Osborne, Cary, NC (US); Thomas John Sluchak, Apex, NC (US); Michael William Stuart Ripp, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1799 days.

(21) Appl. No.: 14/319,945

(22) Filed: Jun. 30, 2014

(65) Prior Publication Data

US 2015/0378546 A1 Dec. 31, 2015

(51) Int. Cl.
*G06F 1/16* (2006.01)
*G06F 3/0484* (2013.01)

(52) U.S. Cl.
CPC ........ *G06F 3/04847* (2013.01); *G06F 1/1692* (2013.01)

(58) Field of Classification Search
None
See application file for complete search history.

(56) References Cited

U.S. PATENT DOCUMENTS

| | | | |
|---|---|---|---|
| 6,932,524 B2 * | 8/2005 | McLoone | G06F 3/0213 400/472 |
| 7,911,137 B2 | 3/2011 | Tyldesley et al. | |
| 9,448,631 B2 * | 9/2016 | Winter | G06F 3/016 |
| 9,677,740 B2 * | 6/2017 | Steiner | F21V 9/40 |
| 2002/0110465 A1 * | 8/2002 | Lai | G02F 1/13338 417/417 |
| 2002/0191029 A1 * | 12/2002 | Gillespie | G06F 3/0488 715/810 |
| 2003/0043123 A1 * | 3/2003 | Hinckley | G06F 3/021 345/173 |
| 2005/0024340 A1 * | 2/2005 | Bathiche | G06F 3/0238 345/170 |
| 2008/0168382 A1 * | 7/2008 | Louch | G06F 9/4443 715/781 |
| 2009/0315867 A1 * | 12/2009 | Sakamoto | G06F 3/03547 345/184 |
| 2011/0047459 A1 * | 2/2011 | Van Der Westhuizen | G06F 1/1692 715/702 |
| 2013/0038546 A1 * | 2/2013 | Mineo | G06F 3/167 345/173 |
| 2013/0050134 A1 * | 2/2013 | Stewart | G06F 3/041 345/174 |
| 2013/0215035 A1 * | 8/2013 | Guard | G06F 3/0221 345/168 |

(Continued)

OTHER PUBLICATIONS

Review/ Logitech diNovo Edge by Jonathan Kwan Published Apr. 14, 2007. Internet Wayback Archive. 8 pages.*

(Continued)

*Primary Examiner* — Hien L Duong
(74) *Attorney, Agent, or Firm* — Brian J. Pangrle (57) ABSTRACT

A system can include a processor; memory operatively coupled to the processor; a display operatively coupled to the processor; a touch sensitive surface that comprises a slider region; and assignment circuitry that assigns one of a plurality of assignable system functions to the slider region.

16 Claims, 8 Drawing Sheets

(56) References Cited

U.S. PATENT DOCUMENTS

| | | | | |
|---|---|---|---|---|
| 2013/0235069 | A1* | 9/2013 | Ubillos | G09G 5/026 345/594 |
| 2013/0239057 | A1* | 9/2013 | Ubillos | G06F 3/04855 715/833 |
| 2014/0035861 | A1* | 2/2014 | Soo | G06F 3/044 345/174 |
| 2014/0317564 | A1* | 10/2014 | Odell | G06F 3/0482 715/810 |
| 2015/0084908 | A1* | 3/2015 | Jordan | G09G 5/12 345/174 |
| 2015/0089664 | A1* | 3/2015 | Lee | G06F 21/36 726/27 |
| 2015/0208012 | A1* | 7/2015 | Singhal | H04N 5/4403 348/734 |
| 2015/0248213 | A1* | 9/2015 | Postal | G06F 3/04817 715/835 |
| 2015/0378546 | A1* | 12/2015 | Osborne | G06F 3/04847 715/833 |

OTHER PUBLICATIONS

Logitec Cordless Desktop MX5000 Laser, by Logitec. Published Aug. 6, 2013. Internet Wayback Archive. 11 pages.*
Cyborg Keyboard Keyboard Manual by Saitek. Published Apr. 3, 2008. 17 pages.*
LENOVO, User Guide, ThinkPad X1 Carbon, Jan. 2014 (9 pages).
MFLEX, More About SmartInk(R) Technology, Multi-Fineline Electronix, Inc., 2012 (1 page).

* cited by examiner

MULTI-FUNCTION SLIDE CONTROL

TECHNICAL FIELD

Subject matter disclosed herein generally relates to input devices.

BACKGROUND

An information handling system may include various input devices such as a keyboard and touchpad. Where such a system has a form factor such as that of a notebook computer, etc., space may be limited for input devices.

SUMMARY

A system can include a processor; memory operatively coupled to the processor; a display operatively coupled to the processor; a touch sensitive surface that comprises a slider region; and assignment circuitry that assigns one of a plurality of assignable system functions to the slider region. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
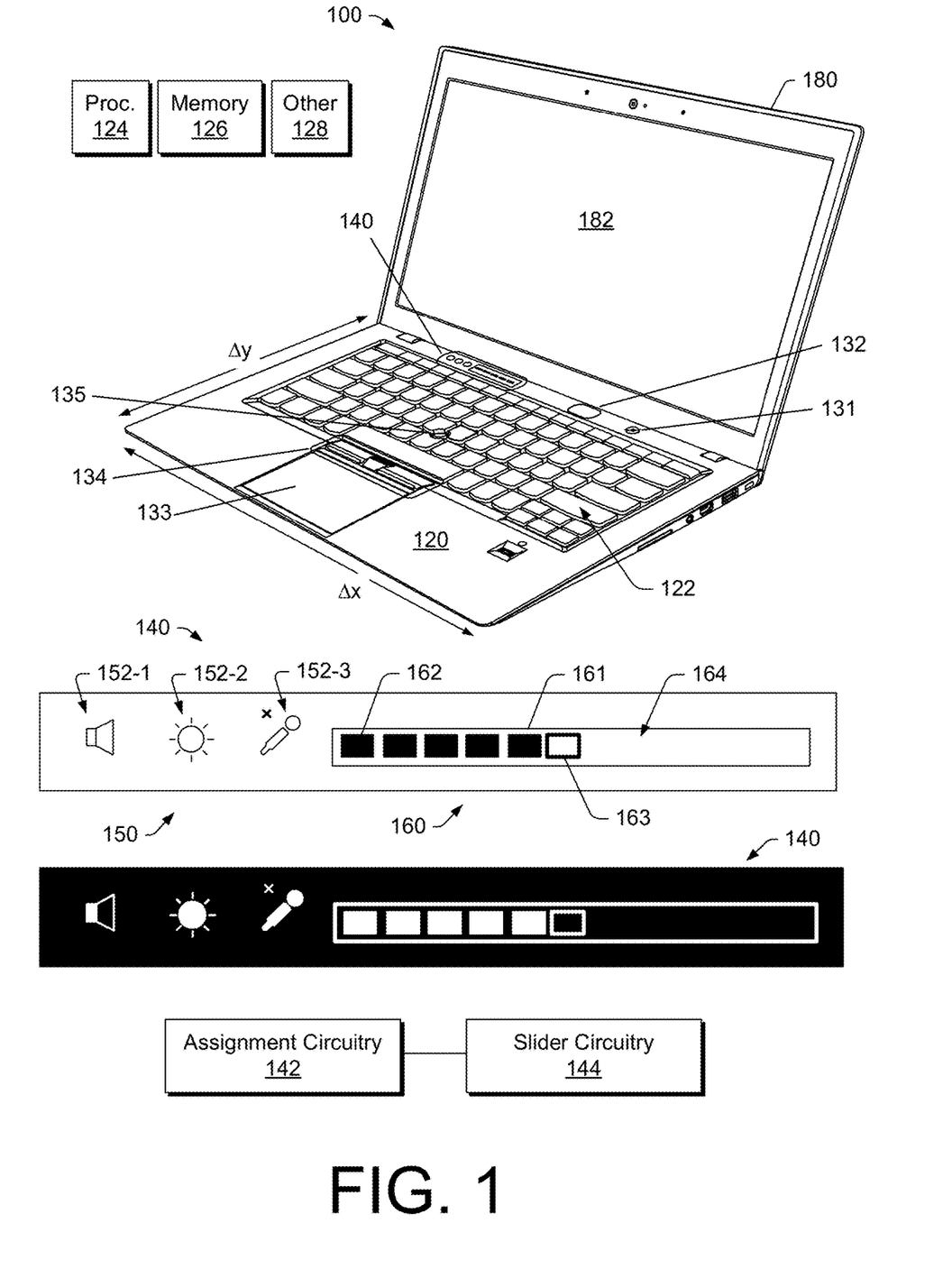
FIG. 1 is a diagram of an example of a system.

FIG. 1 shows an example of an information handling system 100 that includes a keyboard housing 120 with a keyboard 122 and a display housing 180 with a display 182 that are pivotably coupled, for example, to adjust the angle between the keyboard housing 120 and the display housing 180 about a pivot axis. As shown the keyboard housing 120 includes a power button 131, status indicators 132, a touchpad 133, touchpad associated buttons 134, a joystick 135 and a touch sensitive surface 140 that includes a menu region 150 and a slider region 160. As an example, various features of the information handling system 100 may be referenced with respect to a three dimensional coordinate system such as, for example, a Cartesian coordinate system with x, y and z coordinate axes.

In the example of FIG. 1, the touch sensitive surface 140 may be operatively coupled to circuitry such as assignment circuitry 142 and slider circuitry 144. As an example, the information handling system 100 can include a processor 124, memory 126 and other circuitry 128. As an example, the memory 126 may store instructions executable by the processor 124. For example, operating system instructions may be stored in the memory 126 and executable by the processor 124 to establish an operating system environment that can be implemented to execute applications.

As an example, the information handling system 100 can include an embedded controller, for example, as the other circuitry 128. In such an example, the embedded controller may perform functions associated with components such as one or more fans, one or more batteries, etc. As an example, an embedded controller may be operatively coupled to a processor. In such an example, the embedded controller may be configured to transfer information to the processor as associated with components and the processor may be configured to transfer information to the embedded controller as associated with an operating system environment. For example, an embedded controller of a system may transfer a status of a system component to a processor of the system that may cause the processor to shut down the system and the processor may transfer a command to the embedded controller to cause the embedded controller to control a component. As an example, a component may be operable via firmware where a processor and/or an embedded controller may be operatively coupled to the component to instruct component firmware and/or to receive information from component firmware.

As an example, the assignment circuitry 142 may be configured to assign one of a plurality of assignable functions to the slider region 160 of the touch sensitive surface 140 where the plurality of assignable functions may include multiple level functions. For example, consider functions such as firmware level functions, embedded controller level functions, processor level functions, operating system level functions, etc. As an example, assignable functions may include at least one firmware level function and at least one operating system level function.

In the example of FIG. 1, the touch sensitive surface 140 is illustrated as including a light background with dark lines and fills and as including a dark background with light lines and fills. For example, for a white or silver keyboard housing, the light background with dark lines and fills may be aesthetically and visually acceptable while, for a black or darkly colored keyboard housing, the dark background with light lines and fills may be aesthetically and visually acceptable. As an example, a visual slider may provide for relatively expeditious and intuitive control of level for a selected one of a plurality of functions.

As shown in the example of FIG. 1, the menu region 150 of the touch sensitive surface 140 includes various menu items 152-1, 152-2 and 152-3, each of which is individually selectable to assign one of a plurality of functions to the slider region 160. As shown, the slider region 160 of the touch sensitive surface 140 can include a boundary 161 within which exist one or more types of indicators 162 and 163 that may represent state of touch input. For example, a user may touch a portion 164 of the slider region 160 to cause one or more types of indicators to appear within the portion 164 of the slider region 160. As an example, the indicator 162 may be an intermediate indicator while the indicator 163 may be an end indicator. As shown, the visual appearance of the indicators 162 and 163 may differ.

As an example, a system can include a processor; memory operatively coupled to the processor; a display operatively coupled to the processor; a touch sensitive surface that comprises a slider region; and assignment circuitry that assigns one of a plurality of assignable system functions to the slider region.

As an example, a system can include a processor; memory accessible by the processor; operating system instructions stored in the memory and executable by the processor to establish an operating system environment; a touch sensitive surface that comprises a slider region; and assignment circuitry that assigns one of a plurality of assignable functions to the slider region where the plurality of assignable functions include at least one firmware level function and at least one operating system level function. As an example, the at least one operating system level function can include a function associated with an application executable in the operating system environment.

Figure 2:
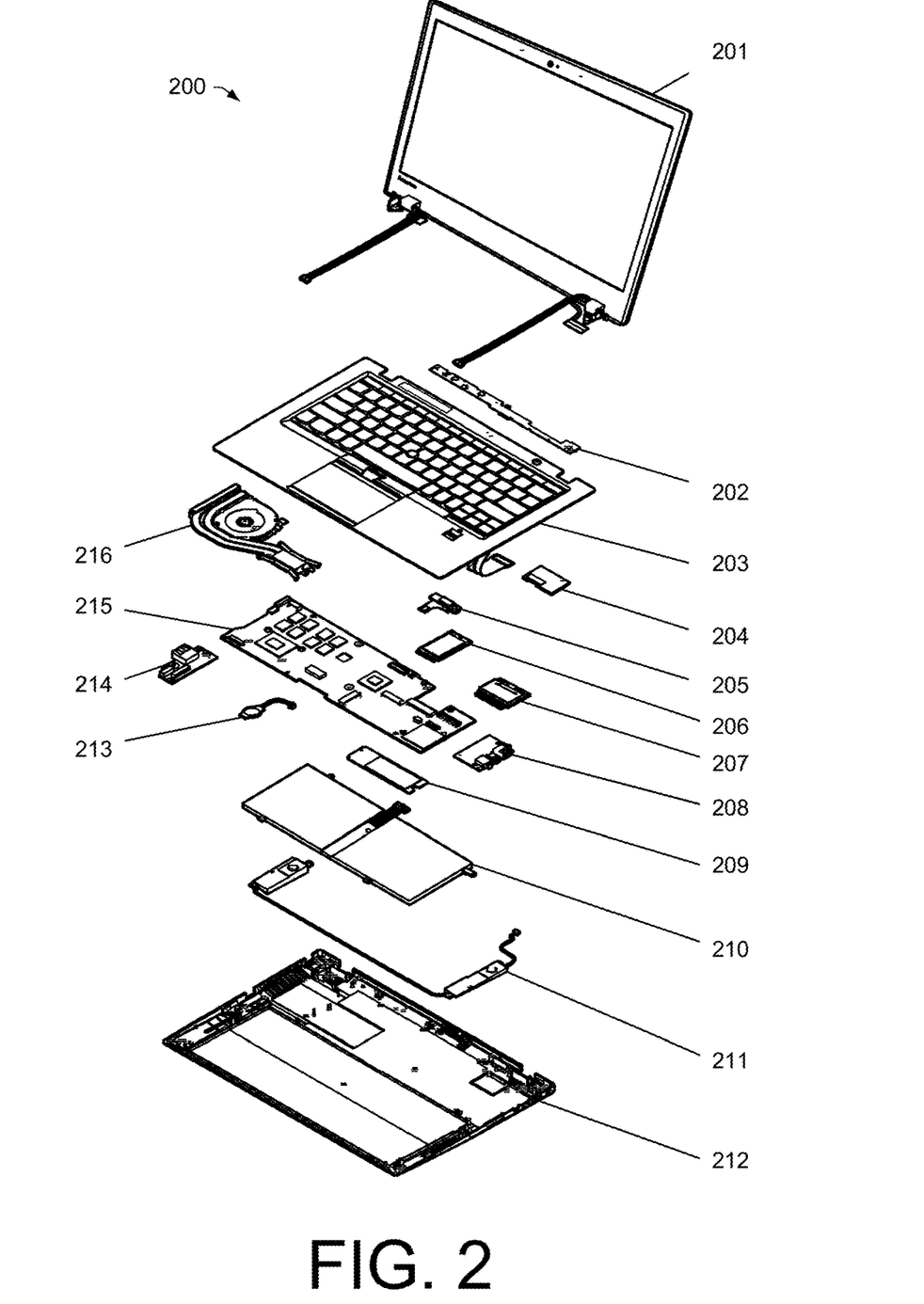
FIG. 2 is a diagram of an example of a system.

FIG. 2 shows an example of a system 200 that includes an LCD unit 201, a circuitry board 202, a keyboard bezel assembly 203, a fingerprint reader 204, a Bluetooth® technology circuitry 205, a wireless LAN circuitry 206, wireless WAN circuitry 207, audio circuitry 208, a solid-state drive 209, one or more batteries 210, a speaker assembly 211, a base cover assembly 212, a backup battery 213, USB circuitry 214, a circuitry board 215 and a fan assembly 216. As an example, the board 202 may include circuitry for various operations of a touch sensitive surface such as the touch sensitive surface 140 of the system 100 of FIG. 1. As an example, the board 215 may include one or more processors and optionally an embedded controller. As an example, the audio circuitry 208 may be operatively coupled to the speaker assembly 211 and, for example, one or more jacks, one or more microphones, the Bluetooth® technology circuitry (e.g., for wireless transmissions of audio information), etc.

As an example, the circuitry board 202 may be operatively coupled to one or more components such that a slider region of a touch sensitive surface may provide for receipt of input to instruct one or more components of the system 200. For example, consider input to instruct the LCD unit 201 (e.g., control of brightness, contrast, etc.), the audio circuitry 208 (e.g., volume control, microphone level control, equalizer, etc.), the fingerprint reader 204 (e.g., sensitivity, etc.), the Bluetooth® technology circuitry 205 (e.g., volume, etc.), the speaker assembly 211 (e.g., volume control, etc.), one or more components of the circuitry board 215 (e.g., for firmware, an application, etc.), the fan assembly 216 (e.g., fan speed, etc.), etc.

Referring to the example menu region 150 of FIG. 1, the menu item 152-1 may be selectable to assign a volume control function to the slider region 160, the menu item 152-2 may be selectable to assign a brightness control function to the slider region 160 and the menu item 152-3 may be selectable to assign a microphone level control function to the slider region 160. As an example, the menu region 150 may be adjustable to display one or more menu items. As an example, the menu region 150 may be scrollable, for example, to scroll menu items (e.g., up-down, left-right, etc.) where a plurality of the menu items can be selectable to assign one of a plurality of functions to the slider region 160.

As an example, a volume control may provide for control of speaker volume (e.g., increase, decrease, mute, etc.). As an example, a brightness control may provide for control of display brightness (e.g., to darken a display, to brighten a display, etc.). As an example, a microphone control may provide for control of a microphone (e.g., decrease input level, increase input level, mute, etc.).

As an example, a touch sensitive surface may be configured as an adaptive keyboard row. As an example, a touch sensitive surface may be configured in one or more modes, for example, consider a home mode, a Web-browser mode, a Web-conference mode, a lay-flat mode, etc. As an example, a mode may be enabled by launching an application that executes in an operating system environment (e.g., by automatically changing to a mode that facilitates input for the application). As an example, a menu scroll icon may be presented that allows for cycling through multiple modes. As an example, one or more modes can include a slider region, which may, for example, be assigned one of a plurality of functions.

As an example, a circuitry board may include circuitry for operation of a touch sensitive surface that includes electroluminescent material. As an example, such a circuitry board may include one or more interfaces. For example, such a board may include a power interface and a signal interface. As an example, a signal interface may include a data line and a clock line. For example, consider an interface such as the $I^2C$ interface. A circuitry board may include a microcontroller and a signal interface such that the microcontroller (e.g., operable via firmware, RISC, etc.) can receive and/or transmit information. As an example, a circuitry board may include master circuitry to be a master of a bus and/or include slave circuitry to be a slave of a bus. As an example, a circuitry board may be operatively coupled to an embedded controller via a signal interface such as, for example, an $I^2C$ interface.

As an example, circuitry can include an audio codec circuitry, an audio amplifier, etc. Such circuitry may provide for analog inputs to ADC, digital microphone, serial ports, etc. and outputs DAC-fed amplifiers, serial ports, etc. As an example, circuitry such as audio codec circuitry may be controllable via one or more busses. For example, consider an $I^2C$ bus that may be coupled to an $I^2C$ interface of audio codec circuitry such that the audio codec circuitry may respond to instructions executed by a microcontroller (e.g., of touch sensitive unit), an embedded controller, a processor (e.g., according to one or more applications, etc.), etc.

As an example, circuitry such as audio codec circuitry may operatively couple with wireless communication circuitry via lines such as clock and data lines (e.g., XSP_LRCK, XSP_SCLK, XSP_SDIN, XSP_SDOUT). As an example, an audio codec may be operatively coupled to one or more serial ports, which may be configured to communicate audio (e.g., and voice) data to and from components such as, for example, an application processor, a Bluetooth® transceiver, a cell-phone modem, etc.

As an example, a system may include $I^2S$ technology (e.g., also known as Inter-IC Sound, Integrated Interchip Sound, or IIS), which specifies an electrical serial bus interface standard that can be implemented for operatively coupling one or more digital components with respect to audio information. As an example, a touch sensitive unit may include an interface such as an $I^2S$ interface, for example, to control audio circuitry.

As an example, a touch sensitive surface may include circuitry operatively coupled to audio circuitry, for example, to provide audio feedback responsive to touch input. As an example, a beep or other sound may be generated responsive to touching of a touch sensitive surface. As an example, a sound may be generated responsive to swiping a finger on a slider region of a touch sensitive surface. For example, a tone may increase or decrease depending on direction of a swipe.

Figure 3:
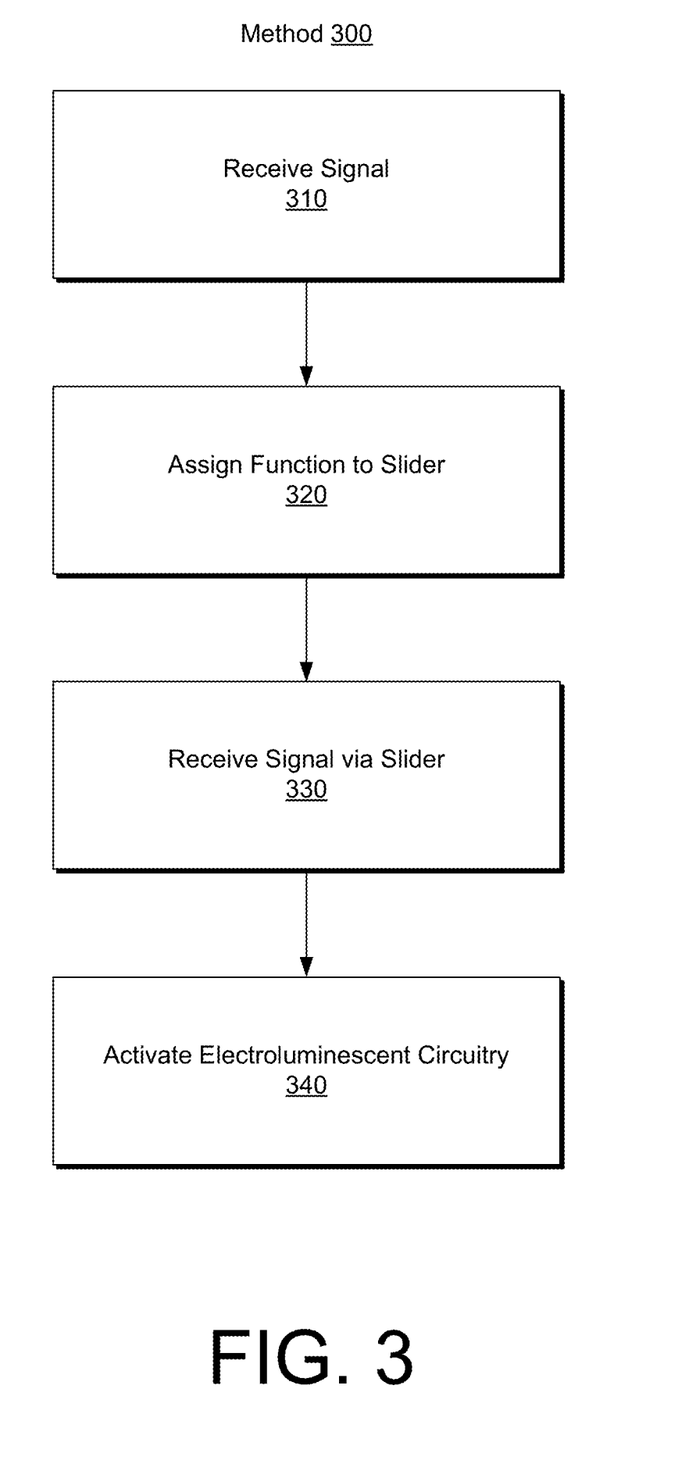
FIG. 3 is a diagram of an example of a method.

FIG. 3 shows an example of a method 300 that includes a reception block 310 for receiving a signal and an assignment block 320 for, based at least in part on the signal, assigning one of a plurality of assignable system functions to a slider region of a touch sensitive surface. The method 300 may also include a reception block 330 for receiving a signal via the slider region of the touch sensitive surface and an illumination block 340 for, responsive to receiving the signal, activating an electroluminescent circuit that illuminates a portion of the touch sensitive surface.

As an example, an electroluminescent display includes electroluminescent particles, such as phosphor, disposed between electrodes where at least one of the electrodes is a transparent electrode (e.g., indium tin oxide (ITO)) over which exists at least one layer of electroluminescent material such as, for example, electroluminescent particles encapsulated in aluminum oxyhydroxide beads within a dielectric matrix. In such an example, a further layer of dielectric material can be provided over the phosphor to avoid short-circuiting problems and a further electrode can include a silver-loaded printed ink. Such a display may be laid out on a substrate such as, for example, PET. As an example, a dielectric material may include barium titanate in a fluoropolymer resin matrix. An electroluminescent display can emit light responsive to generation of an electric field between electrodes (e.g., to activate electroluminescent particles). As an example, an electroluminescent display may include a protective intermediate layer, for example, between a transparent electrode and phosphor. For example, consider a layer with about a 10 percent concentration mixture of barium titanate in a fluoropolymer resin. Such a layer may be white due to the presence of barium titanate and may act as a diffuser to smooth out contrast between areas of phosphor and areas without phosphor when an electroluminescent display is not illuminated. As an example, a layer may include one or more dyes, which may act to color a region. Such a dye layer may act to alter contrast of a display, for example, when the display is in an off state.

As an example, a display associated with a touch sensitive surface that includes a slider region may include one or more electroluminescent circuits. As an example, a display associated with a touch sensitive surface that includes a slider region may include SmartInk® technology (Multi-Fineline Electronix, Inc., Irvine, Calif.), which uses liquid crystal technology to create a low profile display that may be visible to a user in various light conditions. As an example, a display may include differentiated regions (e.g., via use of brightness levels, animation, etc.). As an example, a display may be integrated with capacitive, resistive, mechanical domes, etc., as touch sensitive mechanics. As to animation, as an example, indicators may be animated to convey information. In such an example, consider a microcontroller that causes a sequence to animation instructions to highlight indicators with respect to time.

As an example, a touch sensitive surface may include capacitive touch elements, for example, configured as chevrons that can define linear touch positions. For example, such chevrons may be oriented in a swipe direction of a slider region (e.g., left to right, up to down, right to left, down to up, etc.). As an example, circuitry for sensing touch may operate at a sampling rate (e.g., X Hz). As an example, a touch sensitive surface may be configured with a dimension that is about that of a finger width (e.g., for an index finger) or, for example, with a dimension that is about that of a keyboard key height. As an example, a slider region may include a length dimension that is about that of several keyboard key widths, for example, consider a slider region of a about three key widths.

As an example, a touch sensitive surface can include circuitry for sensing touch and circuitry for illuminating one or more regions of the touch sensitive surface. As an example, such circuitry may include a microcontroller (e.g., ARM, ARC, RISC, etc.). As an example, such circuitry may be operatively coupled to one or more components. For example, circuitry of a touch sensitive surface may be operatively coupled to an embedded controller, a processor or an embedded controller and a processor. As an example, a microcontroller may include instructions stored in memory that are executable by the microcontroller such that the microcontroller can receive signals from touch sensitive circuitry (e.g., capacitive, etc.) and can instruct one or more interfaces to transmit signals based at least in part on the received signals. For example, a microcontroller may instruct illumination circuitry for illuminating one or more regions via an interface for the illumination circuitry and may instruct other circuitry via an interface such as, for example, an $I^2C$ interface (e.g., via a wired interface that operatively couples the microcontroller to one or more other components of a system). As an example, circuitry associated with a touch sensitive interface may be powered via a battery, a voltage supply line, etc.

As an example, an input device can include a slide control on a capacitive strip with visual indication. As an example, an input device can include multiple icons that are selectable to use one scale (e.g., a slider region) to switch and control multiple parameters of a system. As an example, an input device can include a slide control that can be scalable to include zoom in/out and one or more other controls. For example, an image may be displayed to a display (see, e.g., the display 182 of the system 100 of FIG. 1) where a slide control may be touched to generate signals that can control zooming of the image (e.g., consider a multi-touch slide control for input such as pinching or expanding a distance between two fingers to effectuate zoom in/out).

As an example, an image may be rendered to a display at least in part by an image editing application where a slide control may function to adjust one or more characteristics of the image (e.g., color, contrast, gamma, etc.). As an example, an editing application may be an application such as an ADOBE® PHOTOSHOP® application (Adobe Systems, Mountain View, Calif.). Such an application may be suitable for raster graphics editing. For example, an application may be configured to edit and/or compose raster images (e.g., in multiple layers with mask support, alpha compositing, color model selection, etc.). As an example, a menu item may be repeatedly selected to scroll through functions, which may optionally be displayed on a display. For example, consider a menu item that can act to select various functions of an image editing application such that a selected function is assigned to a slider region to receive input for that selected function.

As an example, a system may include one or more slide controls on adaptive keyboard row. As an example, such a system may allow for more intuitive user control of variable input parameters (e.g., volume, brightness, microphone sensitivity, zoom, etc.). As an example, a slide control may be provided alternatively or additionally to controls that use "+" and "−" (e.g., controls that can receive repetitive inputs to achieve a desired level). As an example, a slide control may allow for setting a desired level more quickly that use of "+" and "−" controls. As an example, a slide control may conserve space (e.g., real estate of a system), may provide for more intuitive control of one or more parameters, may be more efficient and easier to adjust than "+" and "−" controls, may provide visual indication of a range and position within the range, etc. As an example, a slide control may function in a manner that differs from that of mechanically depressible keys. As an example, a slider region of a touch sensitive surface may be configured for receipt of multi-touch input.

Figure 4:
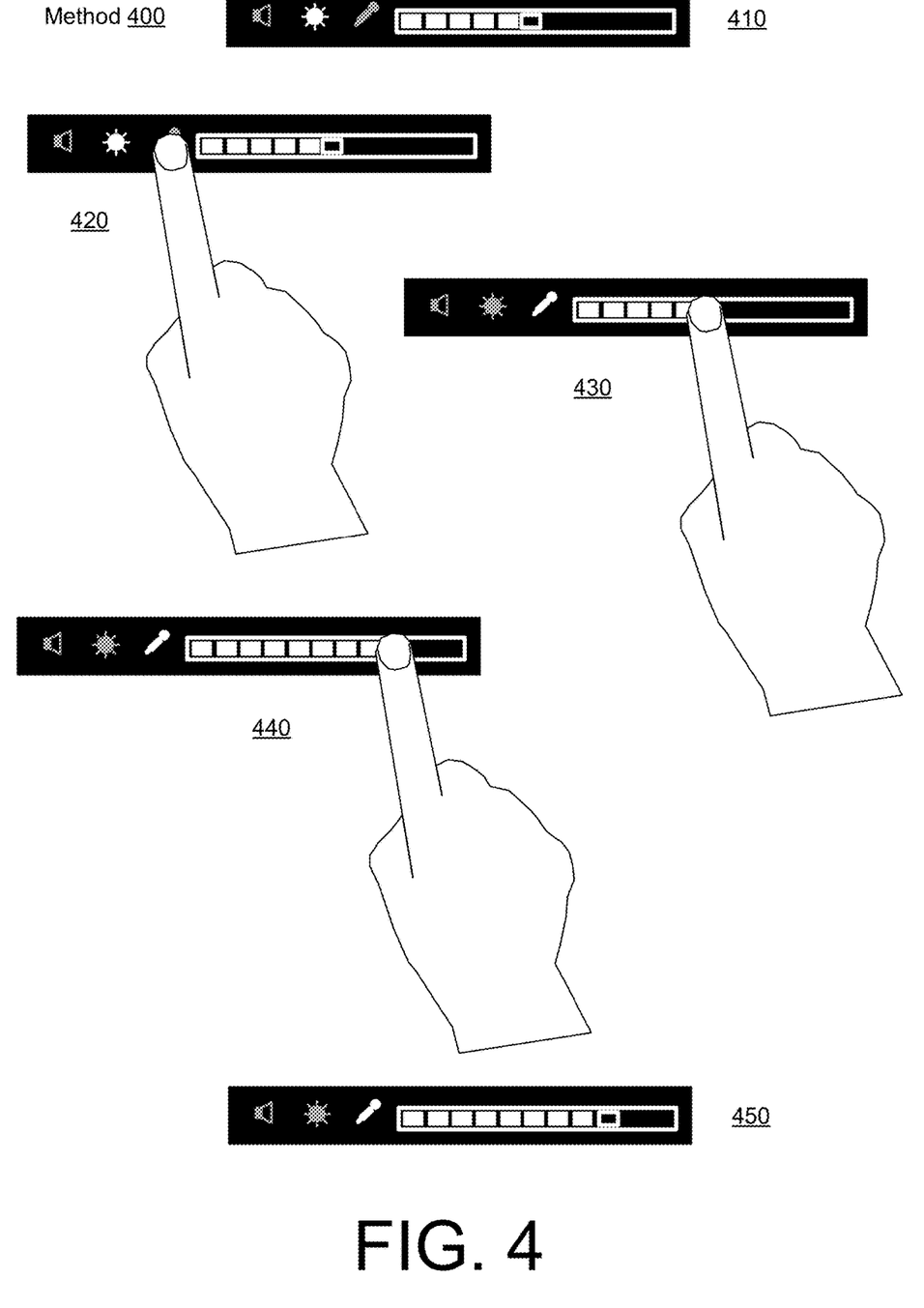
FIG. 4 is a diagram of an example of a method.

FIG. 4 shows an example of a method 400 that includes providing a touch sensitive surface in a first function state 410, receiving input to transition to a different, second function state 420, receiving input to adjust a slide control for the second function state 430, receiving input to adjust the slide control for the second function state 440 and operating a system as instructed via the touch sensitive surface 450. In the example of FIG. 4, the touch sensitive surface may include electroluminescent material that is illuminated by circuitry. As illustrated in FIG. 4, icon (e.g., menu items) may be highlighted upon selection (e.g., upon receipt of touch input). For example, a selected icon may be illuminated to be brighter, a different color, etc. than a non-selected icon.

As an example, a slider region may be configured to function as a security feature. For example, a security code may be entered via touches to a slider region (e.g., slide to right 75 percent of scale, slide to left 25 percent of scale, and slide to right 100 percent of scale). In such a manner, the slide region may function as a combination lock. As an example, for multi-touch input, two fingers may be used to slide to two points, which may optionally be defined with respect to a null.

As an example, a slider region may account for speed, acceleration, etc. of input. For example, a slider region may include circuitry that can sample touch input at a rate sufficient to determine slide speeds and/or slide acceleration. In such a manner, time-dependent gestures may be input via a slider region.

Figure 5:
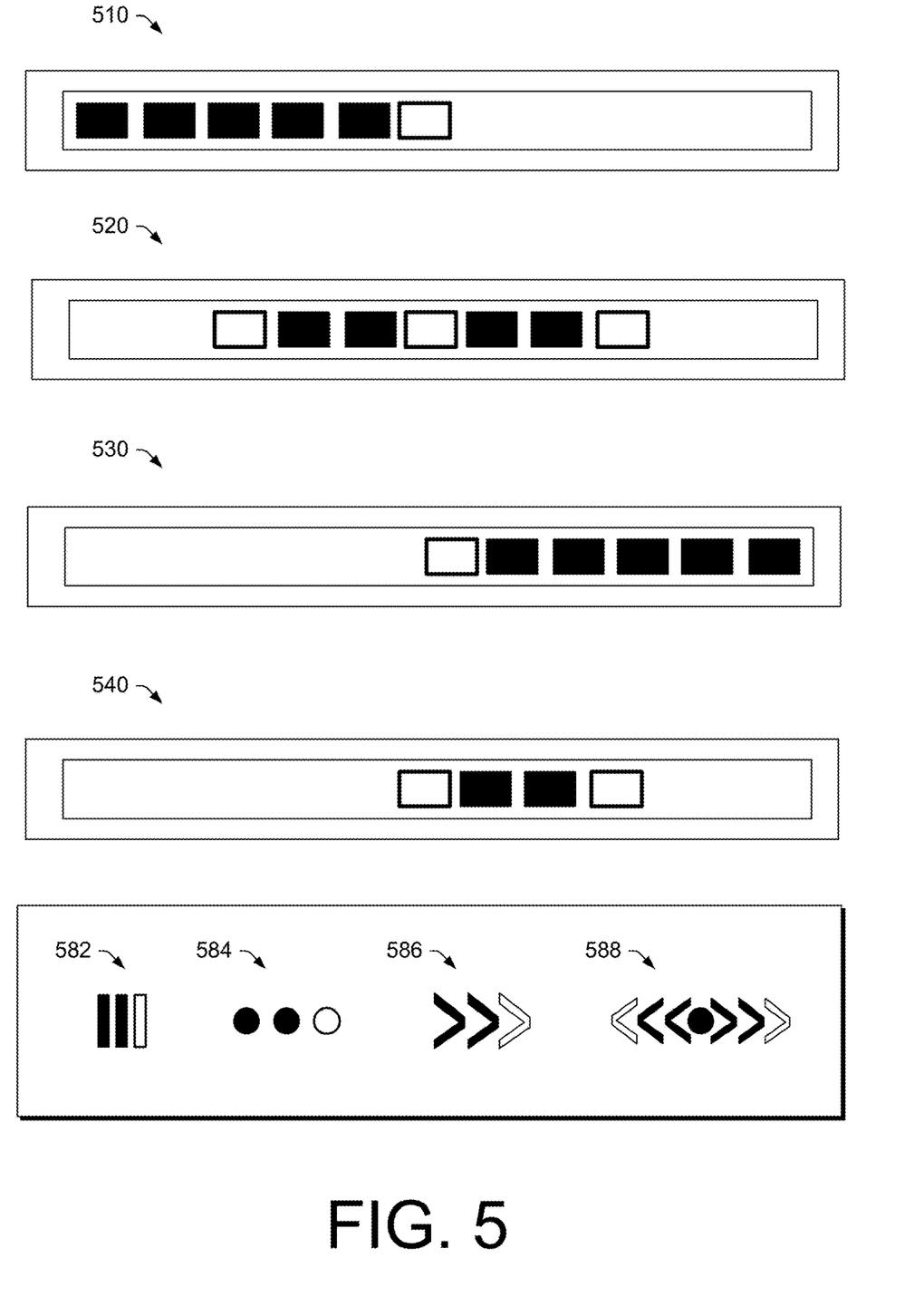
FIG. 5 is a diagram of examples of slider regions and examples of indicators.

FIG. 5 shows examples of slider regions 510, 520, 530 and 540. The slider region 510 includes a left boundary that can be extended to the right. The slider region 520 includes a central null from which input can extend to the left and/or to the right (e.g., consider multi-touch zoom input). The slider region 530 includes a right boundary that can be extended to the left. The slider region 540 includes an intermediate point that can be extended to the right and/or to the left (e.g., optionally a configuration of the slider region 520).

FIG. 5 also shows some examples of shapes for indicators. For example, indicators 582 are shown as polygonal shapes with a greater height than width, indicators 584 are shown as being curved (e.g., circles, ovals, etc.), indicators 586 are shown as being chevron shaped (e.g., optionally to indicate a direction of a slider), and indicators 588 are shown as being of a variety of shapes, including curved and directional (e.g., a circle as a null and chevrons to indicate direction from the null). As an example, a highlighted indicator may be positive with respect to a background color, negative with respect to a background color or other (e.g., consider a combination of positive and negative, etc.).

Figure 6:
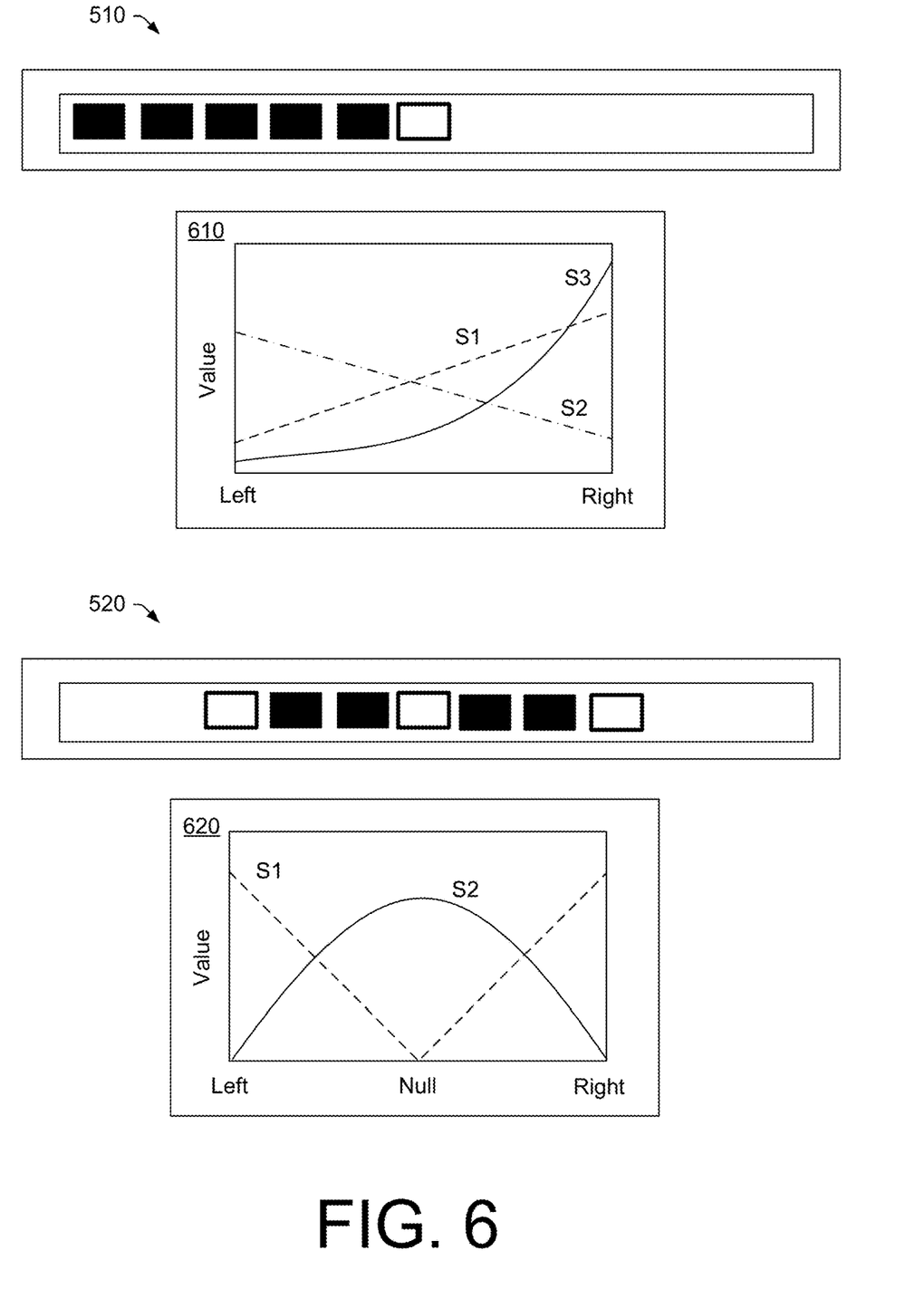
FIG. 6 is a diagram of examples of scales.

FIG. 6 shows examples of scales (e.g., scale functions) 610 and 620 that may be applied, for example, to one or more of the slider regions 510, 520, 530 and 540 of FIG. 5, or optionally one or more other slider regions. As shown in FIG. 6, the scales 610 include a positive slope scale (S1), a negative slope scale (S2) and a non-linear scale (S3). Such scales can include respective minimums and maximums, which may be optionally set via one or more parameters (e.g., via a graphical user interface, etc.). As shown in FIG. 6, the scales 620 include a linear scale with a null (S1) and a non-linear scale with a maximum (S2). Such scales can include respective minimums, maximums and one or more nulls, which may be optionally set via one or more parameters (e.g., via a graphical user interface, etc.).

Figure 7:
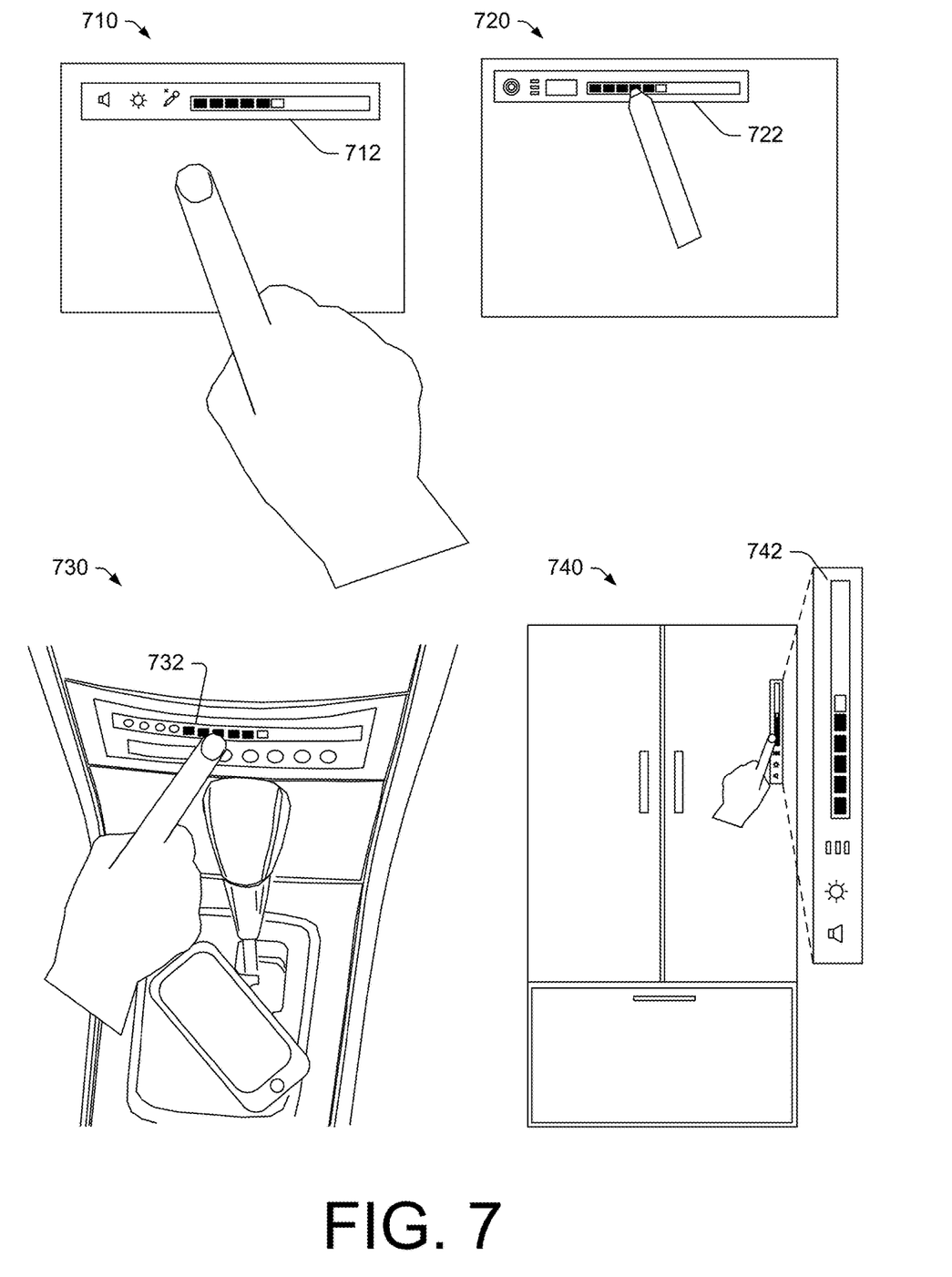
FIG. 7 is a diagram of examples of systems.

FIG. 7 shows examples of systems 710, 720, 730 and 740 that include a touch sensitive surface 712, 722, 732 and 742 where each includes a slider region (e.g., a slide control). The system 710 may be a touchpad system that may be operatively coupled via wire or wirelessly to another system. The system 720 may be a digitizer tablet that may be operatively coupled via wire or wirelessly to another system (e.g., consider swiping to control pen thickness, pen line style, etc.). The system 730 may be a vehicle system where circuitry may operatively couple the slider region of the touch sensitive surface 732 to one or more other systems (e.g., an audio system, a cellular phone system, a computing system, an engine control unit, etc.). As an example, in the system 730 an assignable function of the slider region of the touch sensitive surface 732 may be to control volume of phone audio circuitry and another assignable function may be to control volume of vehicle audio circuitry. As an example, an assignable function may be to control temperature in one or more zones of a vehicle (e.g., a driver zone, a passenger zone, etc.) and another assignable function may be to control fan speed in one or more zones of the vehicle (e.g., a driver zone, a passenger zone, etc.). In such an example, a multi-function slide control (e.g., a slider region of a touch sensitive surface) may be included in a vehicle (e.g., using a limited amount of dash space). The system 740 may be an appliance system (e.g., a household appliance, etc.). For example, the system 740 may be a refrigerator and freezer system where menu items may be provided for refrigerator section control and freezer section control. As an example, controllable functions may be temperature, defrost, lighting, sound, door lock timing, etc. As an example, a system may be an appliance such as a washing machine, a dryer, etc. As an example, a multi-function slide control may function to control one or more of temperature, water level, cycle time, start time, quantity of detergent, quantity of bleach, quantity of fabric conditioner, etc.

As an example, a system may include a single slider region that can perform a selected one of a plurality of functions. Such a slider region may act to conserve space of the system, for example, as a replacement for multiple single, dedicated function sliders of a system.

As an example, a system can include a processor; memory operatively coupled to the processor; a display operatively coupled to the processor; a touch sensitive surface that comprises a slider region; and assignment circuitry that assigns one of a plurality of assignable system functions to the slider region. In such an example, the system can include a row of keys where the slider region is disposed substantially parallel to the row of keys. In such an example, the row of keys can be a mechanically depressible row of keys of a mechanical keyboard.

As an example, a touch sensitive surface can include a menu region that includes menu items, each of the menu items being selectable via touch input to instruct assignment circuitry to assign a respective one of a plurality of assignable functions to a slider region of the touch sensitive surface.

As an example, a plurality of assignable system functions may include at least one firmware level function and at least one operating system level function. As an example, a plurality of assignable system functions can include at least one member selected from a group consisting of a volume control function, a brightness function, a contrast function, a zoom function, a microphone sensitivity function, and a security code function.

As an example, a touch sensitive surface can include a multi-touch sensitive surface. As an example, a system may include scaling circuitry that scales touch input via a slider region of a touch sensitive surface to an output value. In such an example, the scaling circuitry may include a minimum output value parameter and a maximum output value parameter. As an example, scaling circuitry may include at least one scaling function. As an example, a slider region can include a null point that defines two portions of the slider region (e.g., a left region and right region, an upper region and lower region, etc.).

As an example, a slider region of a touch sensitive surface can include electroluminescent material. As an example, a system can include illumination circuitry that activates electroluminescent material responsive to touch input via a slider region. For example, such illumination circuitry may activate the electroluminescent material to illuminate at least one of a series of indicators.

As an example, a touch sensitive unit may include a microcontroller that is operatively coupled to a touch sensitive surface and optionally to a processor (e.g., or an embedded controller or a processor and an embedded controller, etc.).

As an example, a touch sensitive surface may include associated circuitry with an interface that includes a clock line and a data line (e.g., consider an I$^2$C interface).

As an example, an apparatus can include a touch sensitive surface that includes a slider region and a menu region where the menu region includes menu items that correspond to functions assignable to the slider region. In such an example, at least the slider region of the touch sensitive surface may include electroluminescent material.

As an example, a system can include a processor; memory accessible by the processor; operating system instructions stored in the memory and executable by the processor to establish an operating system environment; a touch sensitive surface that includes a slider region; and assignment circuitry that assigns one of a plurality of assignable functions to the slider region where the plurality of assignable functions includes at least one firmware level function and at least one operating system level function (e.g., optionally including a function associated with an application executable in the operating system environment).

As an example, a method can include receiving a signal; and, based at least in part on the signal, assigning one of a plurality of assignable system functions to a slider region of a touch sensitive surface. Such a method may further include receiving a signal via the slider region of the touch sensitive surface; and, responsive to receiving the signal, activating an electroluminescent circuit that illuminates a portion of the touch sensitive surface.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
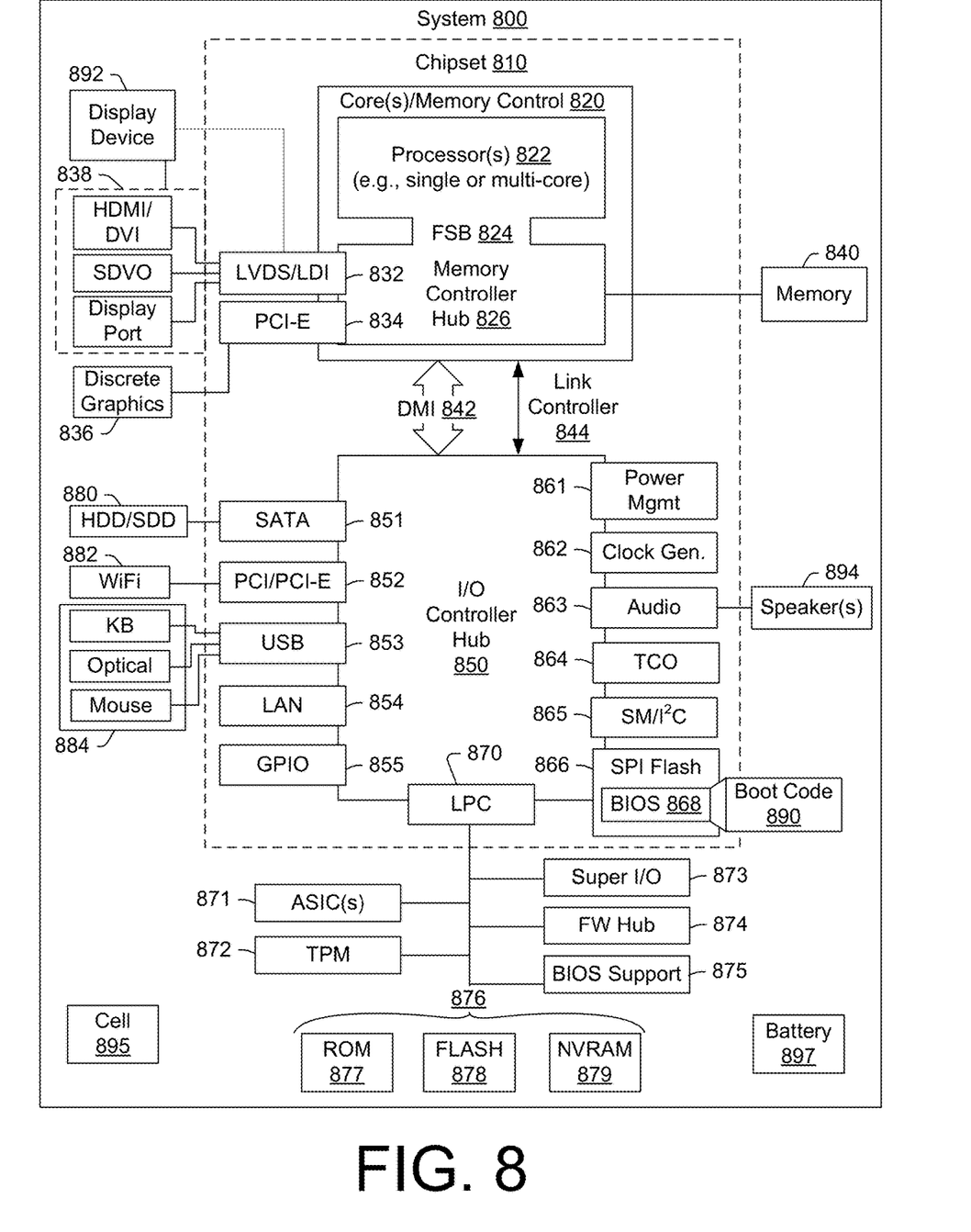
FIG. 8 is a diagram of an example of a system.

While various examples of circuits or circuitry have been discussed, FIG. 8 depicts a block diagram of an illustrative computer system 800. The system 800 may be, as an example, a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a system such as one of the systems of FIG. 7 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800).

As an example, a SMBus may be operable via a LPC (see, e.g., the LPC interface 870), via an I²C interface (see, e.g., the SM/I²C interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a processor;
memory operatively coupled to the processor;
a display housing that comprises a display operatively coupled to the processor;
audio circuitry operatively coupled to the processor;
a keyboard housing that comprises a keyboard and a touch sensitive surface that comprises a menu region and a slider region, wherein the menu region comprises a display brightness item and an audio volume item; and
assignment circuitry that assigns one of a plurality of assignable system functions to the slider region responsive to selection of one of the items, wherein the plurality of assignable system functions comprise a display system brightness function for brightness of the display and an audio system volume function for volume of the audio circuitry.

2. The system of claim 1, the keyboard housing comprising a row of keys and wherein the slider region is disposed substantially parallel to the row of keys.

3. The system of claim 2 wherein the row of keys comprises a mechanically depressible row of keys of a mechanical keyboard.

4. The system of claim 1 wherein each of the menu items is selectable via touch input to instruct the assignment circuitry to assign a respective one of the plurality of assignable functions to the slider region.

5. The system of claim 1 wherein the plurality of assignable system functions comprises at least one firmware level function and at least one operating system level function.

6. The system of claim 1 wherein the plurality of assignable system functions comprises a security code function.

7. The system of claim 1 wherein the touch sensitive surface comprises a multi-touch sensitive surface.

8. The system of claim 1 comprising scaling circuitry that scales touch input via the slider region to an output value.

9. The system of claim 8 wherein the scaling circuitry comprises a minimum output value parameter and a maximum output value parameter.

10. The system of claim 8 wherein the scaling circuitry comprises at least one scaling function.

11. The system of claim 1 wherein the slider region comprises a null point that defines two portions of the slider region.

12. The system of claim 1 wherein the slider region comprises electroluminescent material.

13. The system of claim 12 comprising illumination circuitry that activates the electroluminescent material responsive to touch input via the slider region.

14. The system of claim 13 wherein the illumination circuitry activates the electroluminescent material to illuminate at least one of a series of indicators.

15. The system of claim 1 comprising a microcontroller that is operatively coupled to the touch sensitive surface and to the processor.

16. The system of claim 1 wherein the touch sensitive surface comprises an interface that comprises a clock line and a data line.

* * * * *